March 11, 1969 K. C. JOHNSON 3,431,813
HOLLOW WALL FASTENER
Filed Aug. 3, 1967

INVENTOR.
KENNETH C. JOHNSON
BY
ATTORNEY

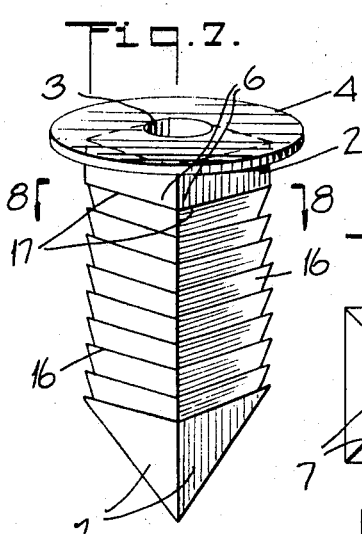
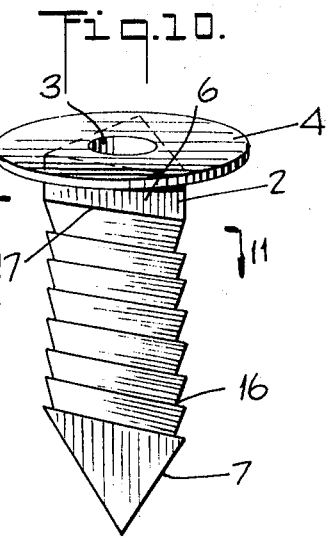
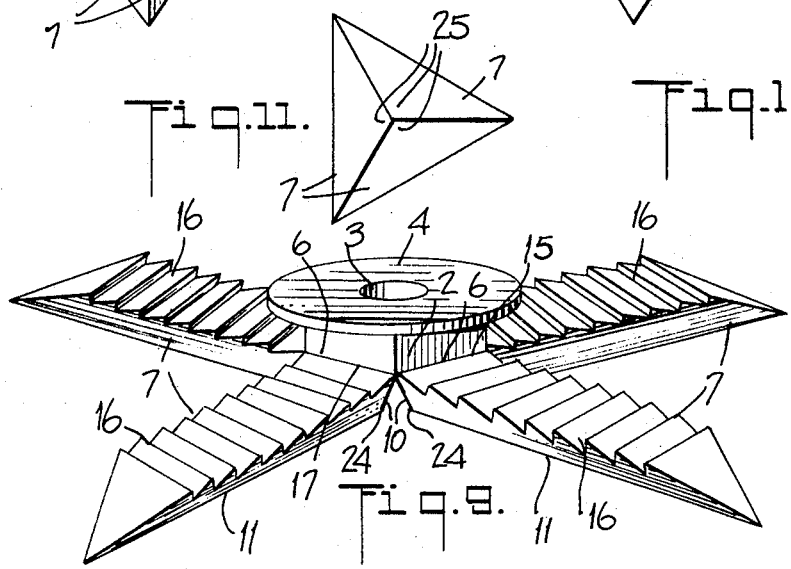
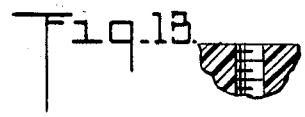
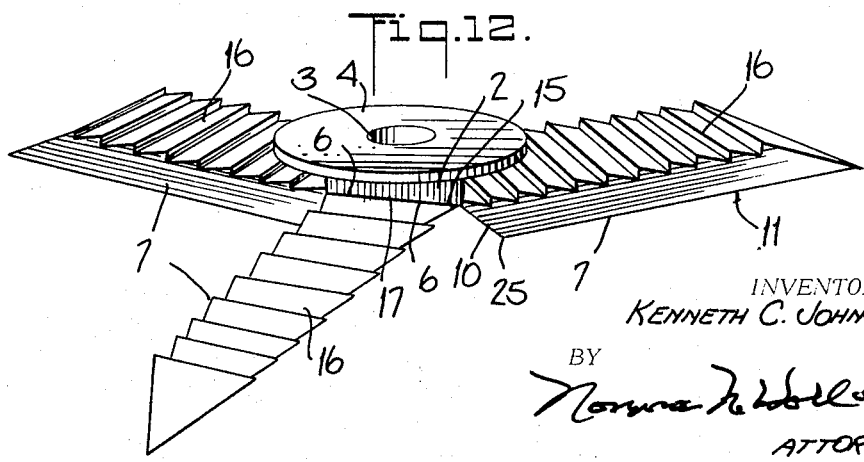

United States Patent Office 3,431,813
Patented Mar. 11, 1969

3,431,813
HOLLOW WALL FASTENER
Kenneth C. Johnson, 5 Village Way,
Smithtown, N.Y. 11782
Continuation-in-part of application Ser. No. 609,072,
Jan. 13, 1967. This application Aug. 3, 1967, Ser. No.
658,204
U.S. Cl. 85—83 18 Claims
Int. Cl. F16b 13/04

ABSTRACT OF THE DISCLOSURE

The present invention is directed to an improved fastener for a hollow wall. The fastener has a body portion with an opening therethrough and outer corners on its lower surface. Legs extend from the lower surface and are hinged and integral with the outer corners of the body portion. The legs are folded together and inserted into an opening in a hollow wall and a threaded member is then inserted into the opening of the body portion. As the threaded member moves through the opening it contacts the inner edges of the legs and spreads them apart so that they bear against the inside of the wall. The legs partially crumble the wall to hold the fastener in place and are provided with teeth to assist in this gripping action. Preferably the fastener is made of polypropylene so that continued hinging action may be obtained without danger of breakage, although the fastener may be made of other materials, such as metal.

Cross references

This is a continuation-in-part of United States patent application Ser. No. 609,072 filed Jan. 13, 1967, now abandoned.

Brief summary of invention

The present invention relates to a wall fastener and more particularly to a hollow wall fastener adapted to be inserted into a hollow wall for holding articles and the like.

A number of fasteners have been used in the past for securing or suspending articles on hollow walls, such as, for example, plasterboard walls. In view of the thinness of such hollow walls it has been necessary to provide a mechanism for gripping the inner side surface of the wall in order to permit the fastener to be held in place. Fasteners which are presently in use are complicated, hard to handle and require expensive machinery to manufacture the fastener thereby making such previous fasteners expensive.

In order to overcome these objections the present invention provides a fastener which has a body portion with an opening therethrough and at least two legs extending therefrom. The legs are folded together and the fastener is inserted into an opening in the body portion so that it contacts the legs and spreads them apart and causes them to bear against the inner surface of the wall.

The present invention overcomes these objections and has for one of its objects the provision of an improved fastener for use in hollow walls.

Another object of the present invention is the provision of a hollow wall fastener which may be molded from plastic without requiring any special machinery.

Another object of the present invention is the provision of an improved fastener which may be used with any size screw or nail and which may be provided with a self-tapping hole.

Another object of the present invention is the provision of an improved fastener which can be easily used by an inexperienced person.

Another object of the present invention is the provision of an improved fastener which has a thin flange so that the hinging action is facilitated without danger of breakage.

Another object of the present invention is the provision of an improved fastener which can be applied without rotation thereof.

Another object of the present invention is the provision of a hollow wall fastener which has a longer life than existing fasteners.

Another object of the present invention is the provision of an improved fastener which will resist any attempt to withdraw it from hollow walls.

Other and further objects of the invention will be obvious upon an understanding of the illustrative embodiment about to be described, or will be indicated in the appended claims, and various advantages not referred to herein will occur to one skilled in the art upon employment of the invention in practice.

Description of views

A preferred embodiment of the invention has been chosen for purposes of illustration and description and is shown in the accompanying drawings, forming a part of the specification wherein:

FIG. 7 is a perspective view of another embodiment of the present invention;

FIG. 8 is a sectional view taken along line 8—8 of FIG. 7;

FIG. 9 is a perspective view showing the position of the legs when in spread position;

FIG. 10 is a perspective view of another embodiment of the present invention;

FIG. 11 is a sectional view taken along line 11—11 of FIG. 10;

FIG. 12 is a perspective view showing the position of the legs when they are open;

FIG. 13 is a detail showing another embodiment.

Detailed description

Figure 1:
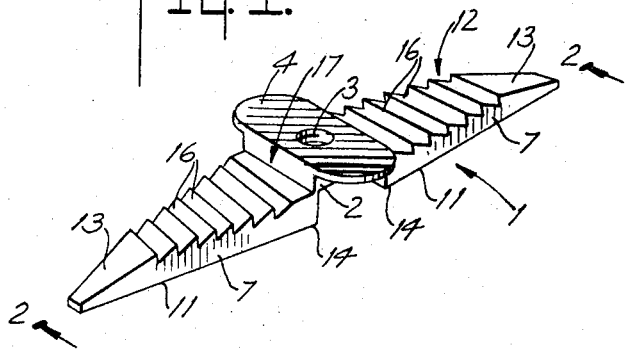
FIG. 1 is a perspective view of a hollow wall fastener made in accordance with the present invention.

Referring more particularly to the drawings, the hollow wall fastener 1 of the present invention comprises a thin body portion 2 having an opening 3 therein which is preferably smooth. However, the opening 3 may be threaded if desired, as shown in FIG. 13, as especially if the fastener is made out of metal. The body portion 2 has a thin flange 4 extending from its upper surface to act as a stop to prevent the entire fastener from being inserted into an opening 24 in a hollow wall 20. The body portion 2 is preferably non-circular (square as shown in the drawings) to prevent it from rotating when a screw is being turned to tighten it.

The body portion 2 has a lower surface 5 opposite flange 4 and extending from each corner 6 of the lower surface 5 is a gripping leg 7. Each gripping leg 7 is provided with a top wall 10, inner walls 11, outer gripping wall 12 and lower inwardly tapered portion 13. The top wall 10 is provided with an inner corner 14 and an outer corner 15 and the outer wall 12 is provided with a plurality of gripping teeth 16.

Figure 3:
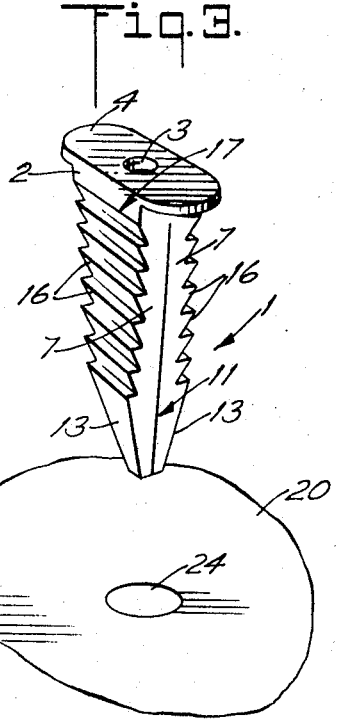
FIG. 3 is a perspective view showing the hollow wall fastener immediately before it is inserted into an opening in a wall.

The outer corner 15 of each leg 7 is connected to the outer corner 6 of the body portion 2 to form a hinge 17. In molding the fastener, the leg 7 is integral with body portion 2 at hinge 17. The fastener is preferably made of polypropylene so that the hinge 17 can be bent any number of times without danger of breakage. However, the fastener may be made of other materials, such as metal. A thickness of each leg 7 is preferably about one half of the width of the body portion 2 so that when both legs 7 are folded, as shown in FIGS. 4 and 3, the outer edges of the body portion 2 and the outer walls 12 of the legs 7 will be substantially contiguous with each other.

Figure 4:
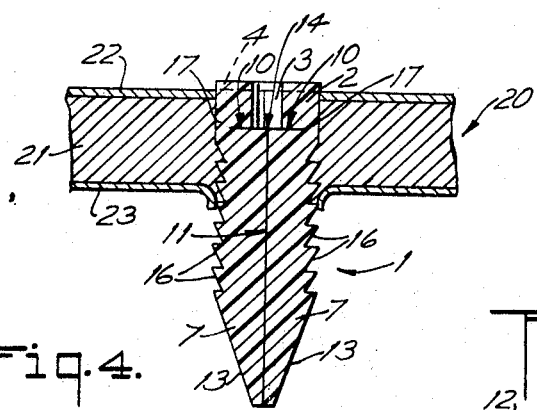
FIG. 4 is a sectional view showing the position of the fastener after it is inserted into the wall.
Figure 2:
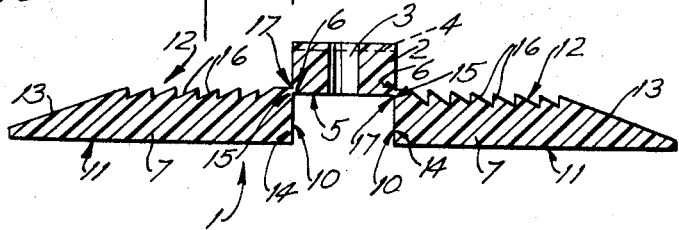
FIG. 2 is a sectional view taken along line 2—2 of FIG. 1.

The fastener is adapted to be inserted in a hollow wall 20, as shown in FIG. 4 which is made out of plasterboard material and which comprises an inner plaster body 21 interposed between outer and inner sheets of paperboard material 22 and 23. A hole 24 is formed in the hollow wall 20 and the folded hollow wall fastener 1 is inserted into the hole 24, as shown in FIGS. 3 and 4 so that the legs 7 extend through and beyond the inner sheet 23 of the wall 20. The opening 24 may be a small opening, made by a nail or the like, and the fastener may be hammered into the small opening so that the fastener makes its own snugly fitting opening. The fact that the fastener is not circular will prevent the fastener from spinning.

Figure 5:
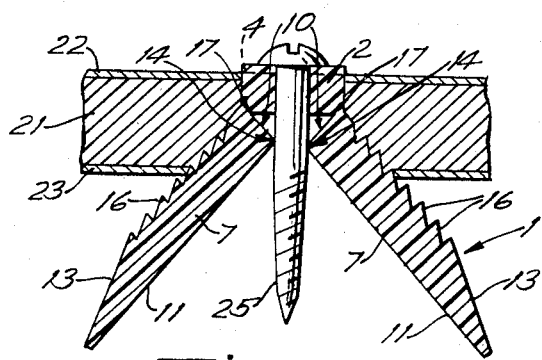
FIG. 5 is a sectional view showing the position of the fastener after a serrated member has been inserted therein.
Figure 6:
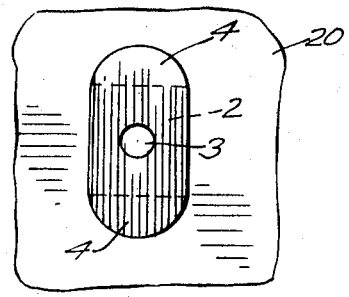
FIG. 6 is an elevational view showing the position of the fastener from the outside of the wall.

A serrated member 25, such as a screw or bolt, is then inserted into the opening 3. Since the opening is smooth and slightly smaller than screw 25, the opening will be tapped as the screw is being turned. If the opening 3 is already threaded then the opening will not be tapped by the screw or bolt. In addition, it is also conceivable to have no opening and to hammer a screw or a ribbed nail into the body portion. The forward portion of the screw 25 strikes the inner corners 14 of the legs 7 and the top walls 10 thereof. The force of the serrated member upon the corners 14 causes the legs 7 to spread apart. The force of the legs on the plaster body 21 crumbles the plaster to enable the legs 7 to become firmly engaged therewith as shown in FIG. 5. The outer corners 14 engage and mesh with the serrations in the serrated member 25 to hold it in place. The teeth 16 permit the legs to bite into the wall 20 and securely hold the fastener 1 in place. The screw 25 will maintain pressure against the legs 7 through inner corners 14 so that the legs are securely anchored to the wall 20. If desired, a ribbed nail may be used instead of the serrated member 25. In addition, the size of the serrated member may be greater or smaller than the diameter of the opening. If it is desired to remove the fastener, it is merely necessary to remove the serrated member and the fastener may be pulled out of the wall.

Referring now to the embodiment shown in FIGS. 7 through 9, the fastener shown is similar to the fastener shown and described in connection with the embodiment shown in FIGS. 1 through 6.

However, the flange 4 is shown in this embodiment as being circular rather than oval. Furthermore, whereas in the embodiment shown in FIGS. 1 through 6, the legs 7 extended from opposite hinges 17 comprised the lower corners of the body portion 2, in the embodiment shown in FIGS. 7 through 9, a leg extends from each of the hinges 17 comprised of the four lower corners 6 of the body portion 2.

With this structure each leg has a triangular cross sectional shape so that when the legs are in the closed position, as shown in FIGS. 7 and 8, a compact fastener will be formed. The apex 24 of each triangularly shaped leg 7 will underlie the opening 3 in body portion 2 so that when a threaded member is inserted into the opening 3 it will strike these apexes 24 to spread the legs 7 out as shown in FIG. 9. In other words, instead of two legs being spread apart as shown in the embodiment shown in FIGS. 1 through 6, all four legs 7 will be simultaneously spread apart.

FIGS. 10 through 12 show still another embodiment of the present invention in which the body portion 2 is in the form of a triangle so that three lower corners 6 thereof are pivotally connected to three legs 7 to form hinges 17. Here again the legs 7 are triangular in cross section, as shown in FIG. 11, to present apexes 25 immediately below the opening 3. This structure operates in the manner similar to the operation of the embodiment shown in FIGS. 7 through 9. When a threaded member is inserted into the opening 3 it will strike all three apexes 25 simultaneously so that the three legs 7 will be spread apart as shown in FIG. 12.

It will thus be seen that the present invention provides an improved hollow wall fastener which has longer life, will not break and which may be molded from a plastic and inexpensively produced. Furthermore, the invention provides a hollow wall fastener which resists any attempt to withdraw it, which may be used with a screw of any size and which has a self-tapping hole so that an inexperienced person can easily use it.

Having thus described my invention, I claim:

1. A fastener comprising a body portion having and opening therethrough with an axis and an upper surface and a lower surface, the lower surface of the body portion having gripping legs extending therefrom, each gripping leg comprising an outer corner and flat upper striking surface extending substantially perpendicular relative to said axis adapted to underlie and abut the lower surface of said body portion, the outer corner of said gripping leg being integral with and pivotally mounted to said lower surface of said body portion, whereby insertion of a spreading member through the body portion will strike the upper striking surfaces of said legs and spread them apart to permit the legs to grip a wall.

2. A fastener comprising a body portion having an opening therethrough with an axis and an upper surface and a lower surface, the lower surface of the body portion having at least two corners, each of said corners having gripping legs extending therefrom, each gripping leg comprising an outer corner and a flat upper striking surface extending substantially perpendicular relative to said axis adapted to underlie and abut the lower surface of said body portion, the outer corner of said gripping leg being integral with and pivotally mounted to said outer corner of said body portion whereby insertion of a spreading member through the body portion will strike the upper striking surfaces of said legs and spread them apart to permit the legs to grip a wall.

3. A fastener as claimed in claim 2, wherein the thickness of each leg is substantially equal to about one half of the width of said body portion.

4. A fastener as claimed in claim 2, wherein said body portion is non-circular.

5. A fastener as claimed in claim 2, wherein said body portion is rectangular.

6. A fastener as claimed in claim 5, wherein said legs are pivotally mounted on each of said corners.

7. A fastener as claimed in claim 5, wherein legs are pivotally mounted on opposed corners.

8. A fastener as claimed in claim 2, wherein each leg is substantially equal to about one-quarter of the width of the body portion.

9. A fastener as claimed in claim 2, wherein said body portion is triangular.

10. A fastener as claimed in claim 9, wherein said legs are mounted on each of said corners.

11. A fastener as claimed in claim 10, wherein each leg is substantially equal to about one-third of the width of the body portion.

12. A fastener as claimed in claim 2, wherein each leg is provided with gripping teeth on its outer surface.

13. A fastener as claimed in claim 2, wherein a flange extends from said upper surface.

14. A fastener as claimed in claim 13, wherein said flange is circular.

15. A fastener as claimed in claim 13, wherein said flange is non-circular.

16. A fastener as claimed in claim 2, wherein said opening is threaded.

17. A fastener as claimed in claim 2, wherein said opening is smooth.

18. A fastener as claimed in claim 2, wherein said fastener is adapted to be inserted into a hollow wall and said legs are adapted to crumble a portion of the hollow wall to grip the wall tightly.

References Cited

UNITED STATES PATENTS

| | | | |
|---|---|---|---|
| 2,058,338 | 10/1936 | Meissner | 85—84 |
| 3,022,701 | 2/1962 | Potruch | 85—83 |
| 3,188,905 | 6/1965 | Millet | 85—84 |
| 3,316,798 | 5/1967 | Johnson | 85—84 |
| 3,318,183 | 5/1967 | Fischer | 85—84 |

FOREIGN PATENTS

| | | |
|---|---|---|
| 819,041 | 6/1937 | France. |
| 711,095 | 6/1954 | Great Britain. |
| 401,379 | 1/1943 | Italy. |

MARION PARSONS, JR., *Primary Examiner.*

U.S. Cl. X.R.

85—84